United States Patent
G V et al.

(10) Patent No.: US 8,818,601 B1
(45) Date of Patent: Aug. 26, 2014

(54) EXTENDED-RANGE ELECTRIC VEHICLE WITH SUPERCAPACITOR RANGE EXTENDER

(71) Applicant: GM Global Technology Operations LLC, Detroit, MI (US)

(72) Inventors: Ravikanth G V, Karnataka (IN); Kumpatla V Naidu, Karnataka (IN); Awadesh Tiwari, Bangalore (IN); Aurobbindo Lingegowda, Karnataka (IN); Viswa Madan Pulavarthi, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/803,000

(22) Filed: Mar. 14, 2013

(51) Int. Cl.
   *G06F 7/00* (2006.01)
   *B60L 11/18* (2006.01)
   *B60K 1/04* (2006.01)

(52) U.S. Cl.
   CPC .......... *B60L 11/1879* (2013.01); *Y02T 10/7005* (2013.01); *Y02T 90/14* (2013.01); *B60K 1/04* (2013.01); *B60K 2001/0438* (2013.01)
   USPC ............. 701/22; 180/65.1; 180/68.5; 493/34; 493/374

(58) Field of Classification Search
   CPC . B60L 11/1879; Y02T 10/7005; Y02T 90/14; B60K 1/04; B60K 2001/0438
   USPC .............. 701/22; 180/65.1, 68.5; 493/34, 374
   See application file for complete search history.

(56) References Cited

U.S. PATENT DOCUMENTS

| | | | |
|---|---|---|---|
| 7,127,337 B2 * | 10/2006 | Bennett et al. | 701/22 |
| 7,993,155 B2 * | 8/2011 | Heichal et al. | 439/374 |
| 8,006,793 B2 * | 8/2011 | Heichal et al. | 180/68.5 |
| 8,245,801 B2 * | 8/2012 | Flett | 180/65.21 |
| 8,454,377 B2 * | 6/2013 | Heichal et al. | 439/247 |
| 8,517,132 B2 * | 8/2013 | Heichal et al. | 180/68.5 |
| 2009/0139781 A1 * | 6/2009 | Straubel | 180/65.1 |
| 2010/0133025 A1 * | 6/2010 | Flett | 180/65.22 |
| 2011/0100735 A1 * | 5/2011 | Flett | 180/65.22 |
| 2011/0297470 A1 * | 12/2011 | Heichal et al. | 180/68.5 |
| 2013/0285581 A1 * | 10/2013 | Meyer et al. | 318/139 |
| 2014/0080648 A1 * | 3/2014 | Kimes | 475/5 |

* cited by examiner

*Primary Examiner* — McDieunel Marc
(74) *Attorney, Agent, or Firm* — Quinn Law Group, PLLC

(57) ABSTRACT

A vehicle includes an engine, fraction motor, final drive assembly, battery pack, and a supercapacitor module electrically connected to the battery pack. The vehicle also has first and second clutches and a controller. The clutches have opposite apply states. The first clutch connects an engine driveshaft to the motor to establish a neutral-charging mode. The second clutch connects an output shaft of the motor to the final drive assembly to establish a drive mode. The controller selects between the drive and neutral-charging modes in response to input signals. The drive mode uses energy from the supercapacitor module and battery pack to power the traction motor. The neutral-charging mode uses output torque from the engine to charge the supercapacitor module and battery pack. The clutches may be pneumatically-actuated, and the vehicle may be characterized by an absence of planetary gear sets.

6 Claims, 3 Drawing Sheets

EXTENDED-RANGE ELECTRIC VEHICLE WITH SUPERCAPACITOR RANGE EXTENDER

TECHNICAL FIELD

The present disclosure relates to an extended range electric vehicle having a supercapacitor range extender.

BACKGROUND

An extended-range electric vehicle powertrain provides one or more electric-vehicle (EV) modes. In an EV mode, a high-voltage electric traction motor is powered via a rechargeable battery pack. Output torque from the electric traction motor is typically delivered to a transmission having one or more planetary gear sets. Braking energy may be recovered during a regenerative braking event to recharge the battery pack. When a state of charge of the battery pack is depleted, the EV range of the vehicle may be extended by selective operation of a small internal combustion engine, with engine torque used to generate additional electricity as needed.

SUMMARY

An extended-range electric vehicle is disclosed herein. The vehicle includes a powertrain having reduced cost relative to conventional designs. The powertrain makes selective use of a stored electrical charge from a semiconductor module, and may be further characterized by an absence of any planetary gear sets. The vehicle includes an internal combustion engine, an electric traction motor, a rechargeable battery pack, and a final drive assembly. The final drive assembly is powered via output torque from the electric traction motor. The vehicle also includes first and second rotating clutches and a controller in communication with the various powertrain elements.

In a particular embodiment, the battery pack may include multiple lead acid battery cells, e.g., eight 6-volt or six 8-volt lead acid battery cells in an example 48 VDC embodiment. Lead acid batteries are typically less efficient at recovering regenerative braking energy relative to lithium ion and nickel metal hydride batteries. Similarly, lead acid batteries may not provide the required power as effectively or efficiently as these other common battery types, particularly during periods of peak vehicle acceleration. As with most battery types, frequent charging and discharging may serve to reduce the useful operating life of the battery pack.

To address these and other design challenges, the present approach electrically connects a supercapacitor module with the battery pack and uses the stored charge of the semiconductor module to help preserve the state of charge (SOC) of the battery pack. Use of the supercapacitor module in the powertrain disclosed herein may help to extend the useful operating life of the battery pack, for instance by reducing the frequency of battery charge/discharge events. An air conditioning compressor or other substantially constant electrical load is absorbed by the engine, thereby allowing the engine to operate at or near its optimum Brake-Specific Fuel Consumption (BSFC) point, as that term is defined herein and well known in the art.

In operation, the controller selectively applies a designated clutch to establish one of two powertrain operating modes: a drive mode and a neutral-charging mode. In drive mode, the first clutch is released and the second clutch is applied. The electric traction motor drives the output member while the engine supplies the necessary power for running the load, e.g., the air conditioning compressor noted above. The electric traction motor draws any required power first from the supercapacitor module and then from the battery pack, thereby moderating the rate of discharge of the battery pack relative to conventional power flow control approaches.

In the neutral-charging mode, the clutch apply states of the drive mode are simply reversed. That is, the first clutch is applied and the second clutch is released. The battery pack and the supercapacitor module may be recharged as needed in this mode. In all embodiments, the first and second clutches are not applied or released at the same time. In other words, the apply states of the first and second clutches are mutually exclusive.

In another embodiment, the vehicle includes an engine having a displacement of less than 300 cubic centimeters, an electric traction motor, a final drive assembly, a rechargeable lead acid battery pack, and a supercapacitor module that is electrically connected to the battery pack. The vehicle also includes first and second pneumatically-actuated clutches, an air conditioning compressor, and a controller. The clutches have, at all times, opposite apply states. As noted above, the first clutch connects the driveshaft of the engine to the electric traction motor when applied to thereby establish the neutral-charging mode, while application of the second clutch connects the motor output shaft to the final drive assembly to establish the drive mode. The air conditioning compressor is driven via the driveshaft in the drive mode. The controller automatically selects between the drive and neutral-charging modes.

The above features and advantages and other features and advantages of the present invention are readily apparent from the following detailed description of the best modes for carrying out the invention when taken in connection with the accompanying drawings.

DETAILED DESCRIPTION

Figure 1:
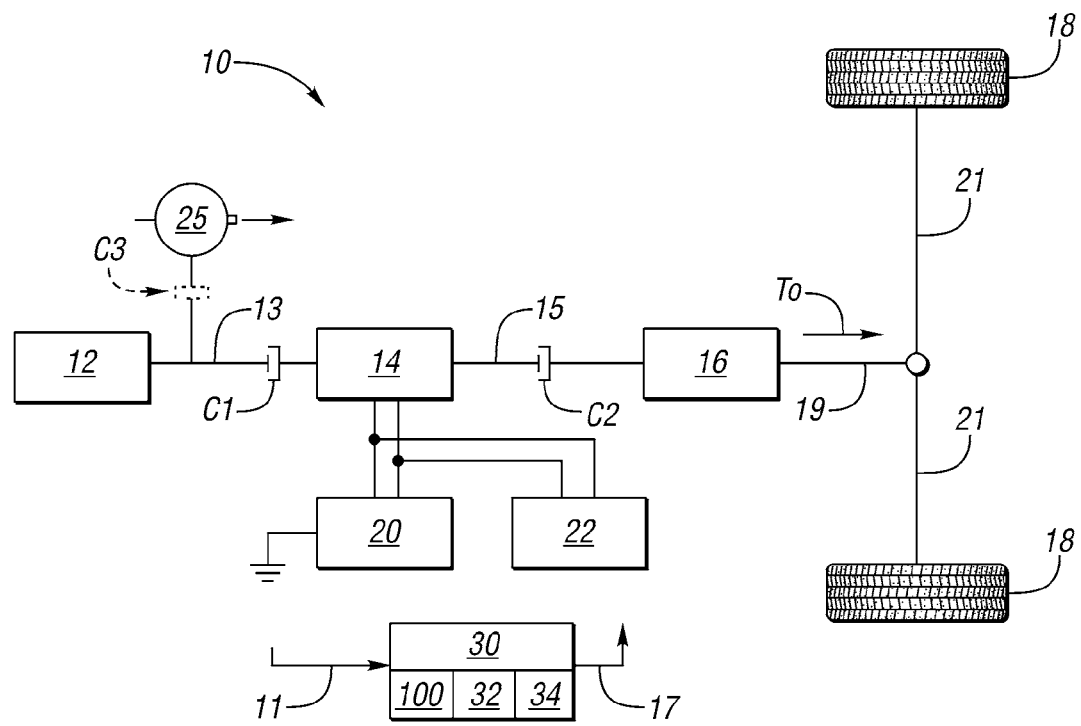
FIG. 1 is a schematic illustration of an extended-range electric vehicle having a range-extending supercapacitor module as described herein.

Referring to the drawings, wherein like reference numbers refer to similar components in the various Figures, an extended-range electric vehicle 10 is shown in schematically in FIG. 1. The vehicle 10 includes a controller 30 having a processor 32 and sufficient tangible, non-transitory memory 34. Computer-executable code embodying a method 100, which is recorded in the memory 34, is selectively executed via the processor 32 to command a shift between two different powertrain operating modes.

Figure 3A:
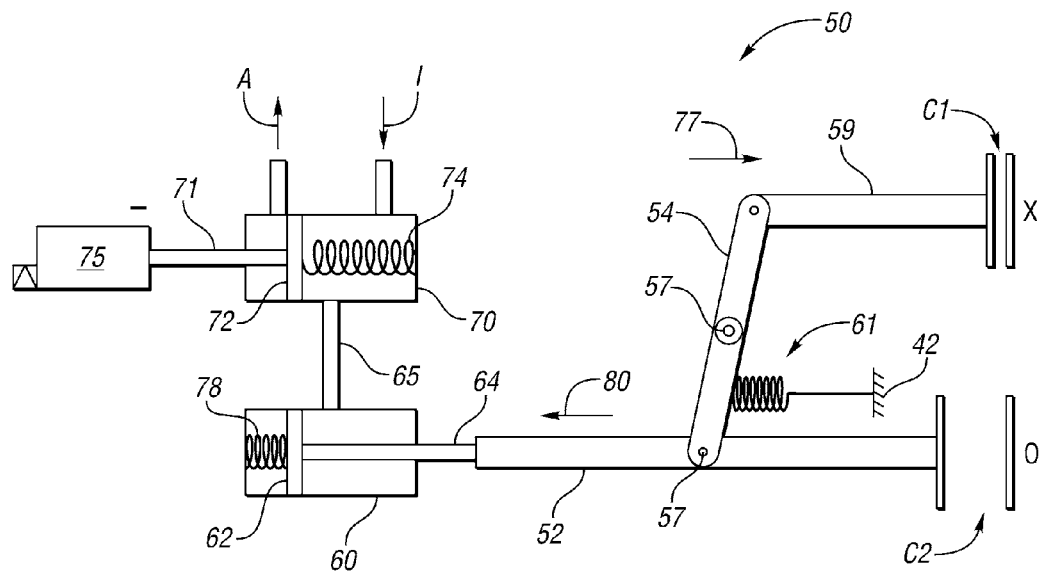
FIG. 3A is a schematic lever diagram describing a first of the two operating modes of FIG. 2, i.e., a drive mode, which may be pneumatically applied.
Figure 3B:
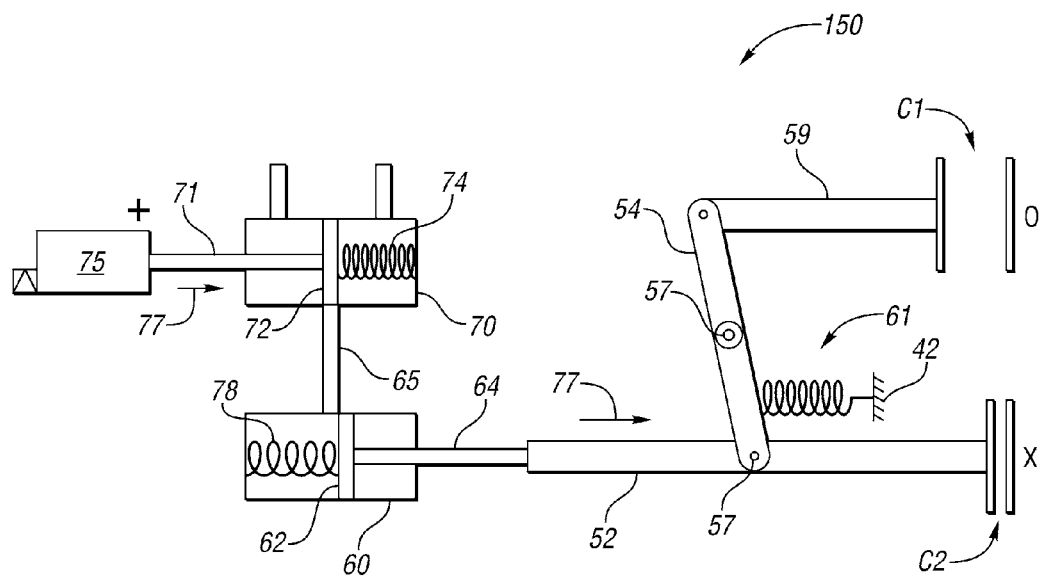
FIG. 3B is a schematic lever diagram describing a second of the two operating modes shown in FIG. 2, i.e., a neutral-charging mode.
Figure 4A:
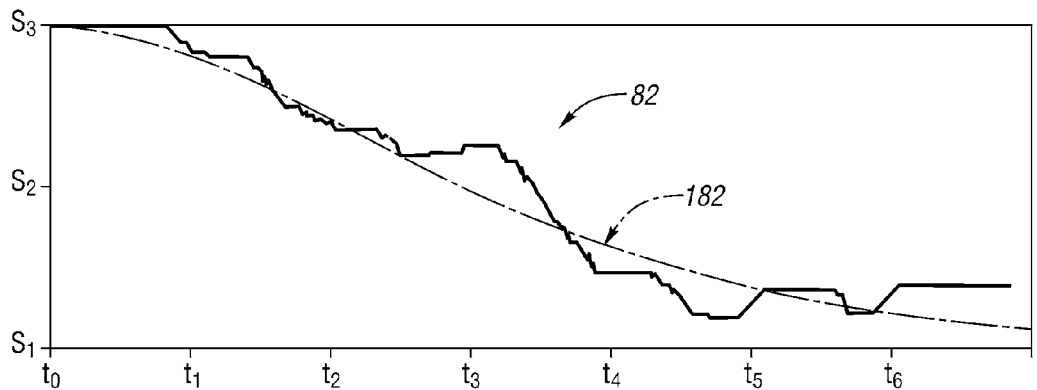
FIG. 4A includes example time plots of the states of charge (SOC) of a battery pack using the present approach and a nominal approach, with time plotted on the x-axis and SOC plotted on the y-axis.
Figure 4B:
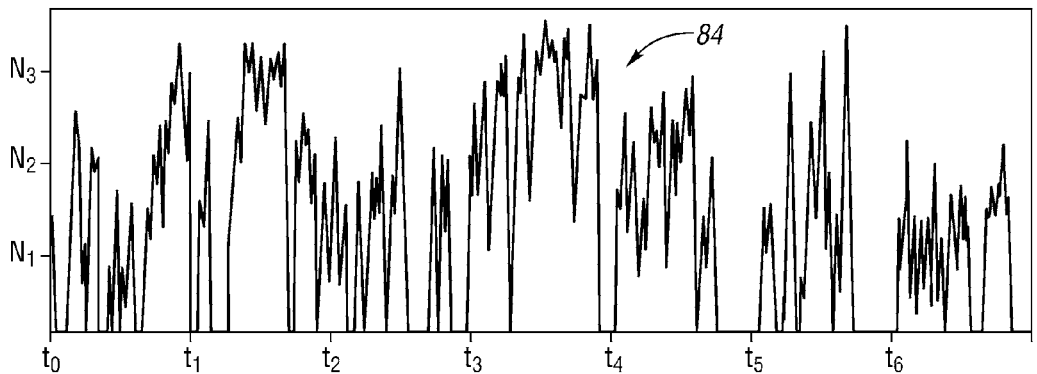
FIG. 4B is a time plot of changing vehicle speed, with time plotted on the x-axis and velocity plotted on the y-axis.
Figure 4C:
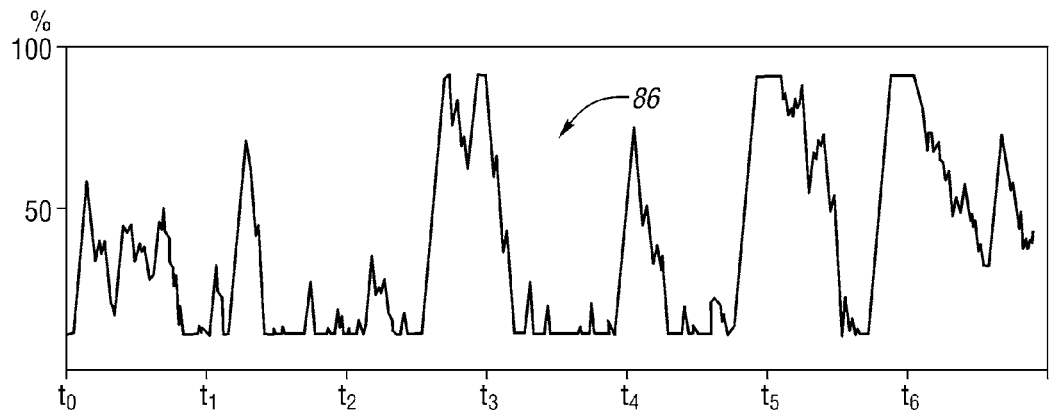
FIG. 4C is a time plot of the level of energy stored in a supercapacitor module of the vehicle shown in FIG. 1, with time plotted on the x-axis and the level of energy plotted on the y-axis.

As explained below with reference to FIG. 2, the two powertrain operating modes of the vehicle 10 are a drive mode and a neutral-charging mode. Example designs for achieving the drive and neutral-charging modes are shown in FIGS. 3A and 3B, respectively, each of which shows an optional pneumatically-actuated embodiment. FIGS. 4A-C collectively illustrate control values used in the execution of the present method 100, with FIG. 4A depicting the effect of the method 100 on the state of charge (SOC) of a battery pack 20 given a changing vehicle speed, as shown in FIG. 4B, and a changing percentage of remaining percentage of a maximum charge of a supercapacitor module 22 as shown in FIG. 4C.

The vehicle 10 of FIG. 1 may include a small internal combustion engine 12, an electric traction motor 14, and a final drive assembly 16, the latter of which provides a desired output gear ratio. As used herein, the term "small" when applied to the engine 12 describes a displacement of less than about 300 cubic centimeters (cc), with a range of 200-250 cc provided in an example embodiment. An output member 19 of the final drive assembly 16 is connected to a set of drive wheels 18 via one or more drive axles 21. Therefore, output torque (arrow $T_O$) from the final drive assembly 16 is ultimately delivered to the drive wheels 18 to propel the vehicle 10.

A driveshaft 13 of the engine 12 is respectively connected to/disconnected from the electric traction motor 14 via application/release of a first clutch C1. Likewise, an output shaft 15 of the electric traction motor 14 is selectively connected to/disconnected from the final drive assembly 16 via a second clutch C2. As described below, the states of clutches C1 and C2 are at all times mutually exclusive. That is, when clutch C1 is applied, C2 is released and vice versa. Application of the respective first and second clutches C1 and C2 may be via any suitable actuator, including via pneumatically-actuated or hydraulically-actuated pistons. An example of the former, which provides a relatively low-cost approach to clutch actuation, is described below with reference to FIGS. 3A and 3B. In all embodiments, the first and second clutches C1 and C2 may be rotating clutches having interspaced friction plates or any other conventional torque transfer mechanism.

The electric traction motor 14 of FIG. 1 draws electrical energy from the battery pack 20. In a particular embodiment, the battery pack 20 is configured as a multi-cell lead acid battery pack, e.g., six 8-volt cells or eight 6-volt cells in possible non-limiting 48VDC examples. The battery pack 20 is electrically connected to the supercapacitor module 22. The term "super" as used herein refers generally to the higher levels of capacitance relative to typical capacitors, as is well known in the art. For instance, in an example configuration the supercapacitor module 22 may have a capacitance level sufficient for storing 125% to 140% or more of the voltage of the battery pack 20. Other combinations of capacitance and battery voltage may be used without departing from the intended inventive scope.

The supercapacitor module 22 shown schematically in FIG. 1 may use one or more double-layer capacitors (DLCs) to help store sufficient standby energy. Such DLCs may use a series of electrodes and a suitable electrolyte, e.g., an organic electrolyte, although other capacitor designs may be employed in the alternative. A supercapacitor such as those used to construct the supercapacitor module 22 can be charged very rapidly relative to the conventional battery cells. The rapid-charging characteristics thus allow selective use of the supercapacitor module 22 of the present approach in the overall operation of the simplified powertrain shown in FIG. 1.

Additionally, torque from the engine 12 may be supplied via the driveshaft 13 to an air conditioning compressor 25 or other comparable electrical load, which is cycled on and off as needed via the controller 30 to cool a passenger compartment (not shown) of the vehicle 10 of FIG. 1. The air conditioning compressor 25 acts as a substantially constant electrical load on the engine 12, for instance a load of 1.5 kW in some designs. Therefore, the engine 12 should be sized to account for the constant load of the air conditioning compressor 25 as well as all other constant and intermittent electrical loads. An optional compressor clutch C3 as shown in phantom may be used to disconnect the air conditioning compressor 25 from the engine 12 and thus minimize spin losses when the air conditioning compressor 25 is not otherwise needed, e.g., when the air conditioning compressor 25 is sufficiently charged.

The controller 30 shown schematically in FIG. 1 may be embodied as a digital computer or multiple such computers each having the processor 32 and sufficient amounts of the memory 34, e.g., read only memory (ROM), random access memory (RAM), optical memory, additional magnetic memory, flash memory, and/or electrically-erasable programmable read only memory (EEPROM). Other associated hardware components of the controller 30 may include a high-speed digital clock, analog-to-digital (A/D) and digital-to-analog (D/A) circuitry, and any required input/output circuitry and devices (I/O), as well as appropriate signal conditioning and buffer circuitry. Any computer-executable code required for operation of the vehicle 10, including instructions embodying the method 100, can be recorded in memory 34 and automatically executed by the processor 32 to thereby establish a required or requested powertrain operating mode.

The controller 30, which is in communication with the engine 12, the electric traction motor 14, the respective first and second clutches C1 and C2, and the optional air conditioning compressor clutch C3, via a controller area network (CAN) and/or other wired/wireless network connection, receives input signals (arrow 11) from the various systems. In response to the received input signals (arrow 11), the controller 30 generates output signals (arrow 17), some of which cause the clutches C1-C3 to either apply or release, with the commanded clutch state depending on the required powertrain operating mode. Two possible operating modes will now be described with reference to FIG. 2.

Figure 2:
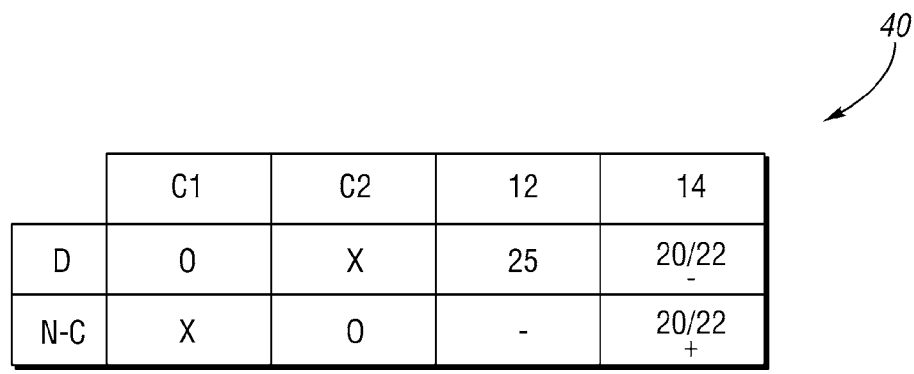
FIG. 2 is a table describing two powertrain operating modes of the vehicle shown in FIG. 1.

A table 40 is shown in FIG. 2 that describes the two basic operating modes of the vehicle 10 shown in FIG. 1, i.e., the drive mode (D) and the neutral-charging (N-C) mode. In drive mode, the first clutch C1 is released (O) and the second clutch C2 is engaged (X). The electric traction motor 14 draws (−) power from the battery pack 20 and/or the supercapacitor module 22 as needed, with discharge priority given to the supercapacitor module 22 as set forth below.

In drive mode, the engine 12 of FIG. 1 supplies any required output energy for powering the air conditioning compressor 25. This helps to ensure that the engine 12 operates at or near its optimum Brake-Specific Fuel Consumption (BSFC) point, with the engine 12 in this mode effectively decoupled from the driveline. As is well understood in the art, the BSFC point provides a measure of engine fuel efficiency, and may be calculated by dividing the fuel consumption rate (r) in grams/second by the power (P) in watts, with $P=\omega T$. In this equation, $\omega$ is the rotational speed of the engine 12 in radians/second and $\tau$ is engine torque in Newton meters.

In neutral-charging mode (NC), the apply states of the respective first and second clutches C1 and C2 are simply reversed. That is, the first clutch C1 is applied (X) and the second clutch C2 is released (O). In this operating mode, the engine 12 may power the electric traction motor 14 as a generator. In turn, the electric traction motor 14 may charge (+) the battery pack 20 and/or the supercapacitor module 22. The neutral-charging mode set forth herein may be particularly beneficial when operating the vehicle 10 of FIG. 1 in a high-density area such as a city or other high-traffic environment in which the vehicle 10 is expected to spend a fair amount of time idling. This otherwise wasted time is used advantageously via the present control approach to recharge the battery pack 20 and/or the supercapacitor module 22. Use of the supercapacitor module 22 also allows the battery pack 20 to be downsized without sacrificing responsiveness to instantaneous electric power demands.

Referring to FIGS. 3A and 3B, schematic lever diagrams are shown for the two powertrain operating modes of FIG. 2, with FIGS. 3A and 3B both showing an example low-cost pneumatically-actuated design. Diagram 50 of FIG. 3A corresponds to the neutral-charging mode noted immediately above, wherein the first clutch C1 is applied and the second clutch C2 is released. First, second, and third linkages 52, 54, and 59, respectively, are connected to each other via hinges 57, which allows linkages 52, 54, and 59 to rotate with respect to each other as needed. As will be evident to one having ordinary skill in the art viewing FIGS. 3A and 3B, such a design may provide substantial cost, weight, and component count advantages relative to conventional hydraulic designs.

A control solenoid 75 may be de-energized (−) via the controller 30 of FIG. 1 to draw an arm 71 in the direction of arrow 80. Inlet air pressure (arrow I), assisted by a return spring 74, moves a plunger 72 within a cylinder 70 in the same direction to unblock an air passage 65. Air pressure is fed into a pneumatic valve 60 through the air passage 65, thus moving a piston 62 in the direction of arrow 80. A return spring 78 is thus compressed within the pneumatic valve. Air in the housing 70 can escape to atmosphere as indicated by arrow A.

The piston 62 may be connected to a rod 64 and the first linkage 52 as shown such that movement of the piston 62 in the direction of arrow 80 pulls the first linkage 52 in the same direction. Movement of the first linkage 52 in turn pulls open the second clutch C2, and thus establishes the released (O) state of second clutch C2 needed for the neutral-charging state. The same movement rotates the second linkage 54, thus forcing the third linkage 59 in the direction of arrow 77. The third linkage 59 compresses the first clutch C1 into an applied (X) state. A spring 61 connected between the second linkage 54 and a stationary member 42 is thus compressed, thereby storing return energy for use in entering the drive mode.

FIG. 3B shows the drive mode via diagram 150. In this mode, the second clutch C2 is applied and the first clutch C1 is released. The control solenoid 75 is energized (+) and inlet air pressure (arrow I of FIG. 3A) is discontinued. The plunger 62 moves in the direction of arrow 77, compresses the spring 74, and is thus properly positioned for entering a subsequent neutral-charging mode. The return spring 78 within the pneumatic valve 60 pushes the piston 62 and rod 64 in the direction of arrow 77. This moves the first linkage 52 in the same direction, which causes the second linkage 54 to rotate counterclockwise with respect to the perspective of FIG. 3B, assisted via stored energy in the spring 61.

The movement of the first and second linkages 52 and 54 pulls the third linkage 59 in the direction of arrow 80, and thus releases (O) the first clutch C1. The same movement pushes the first linkage 52 in the direction of arrow 77 to apply (X) the second clutch C2. The spring 61 may stretch in this motion to store potential return energy for entering the neutral-charging mode shown in FIG. 3A.

As will be appreciated by those having ordinary skill in the art, the vehicle 10 shown in FIG. 1 with its simplified clutching architecture may provide distinct advantages relative to prior art extended-range electric vehicle powertrains. The battery pack 20 may be downsized for a given EV range, which may effectively address space constraints in certain emerging markets. Also, the vehicle 10 may use a single electric traction motor 14 to drive the vehicle 10 in drive mode, and to charge the battery pack 20 and/or the supercapacitor module 22 in the neutral-charging mode. Certain limitations in performance of lead acid battery may be overcome via selective use of the supercapacitor module 22, which can also extend the life of the battery pack 20. Moreover, as the engine 12 does not directly drives the output, and therefore the engine 12 can be operated at its best BSFC point with reduced emissions.

The supercapacitor module 22 may also improve the regenerative energy captured during the drive cycle. This particular advantage is illustrated in FIGS. 4A-C. In each of these Figures, time (t) is plotted on the horizontal axis. FIG. 4A illustrates, via trace 82, the manner in which the SOC of the battery pack 20 of FIG. 1 may decrease using the present control approach. Three nominal SOC levels are shown, from highest SOC to lowest, as $S_3$, $S_2$, and $S_1$. For comparative purposes, trace 182 shows a typical trajectory for a decreasing SOC of a nominal battery pack controlled using existing methods. While traces 82 and 182 both decrease over time, note that the rate of decrease using the present method 100 may be substantially reduced relative the rate of decrease of trace 182.

FIG. 4B shows changing velocity of the vehicle 10 shown in FIG. 1 as trace 84 over the same time period, with relative velocities of $N_1$, $N_2$, and $N_3$. The pattern of trace 84 is typical of driving in heavy traffic or in other stop-and-go driving routes, e.g., on urban surface streets having a substantial number of intersections and/or traffic lights. FIG. 4C illustrates, via trace 86, the level of energy as a percentage (%) stored in the supercapacitor module 22 of FIG. 1. When trace 84 of FIG. 4B shows that the vehicle 10 has stopped, trace 86 of FIG. 4C shows that, in the same interval of time, the supercapacitor module 22 is actively charging. Trace 82 of FIG. 4A generally flattens out in the same interval, which indicates that the rate of decrease in SOC has slowed. As a result, the neutral-charging mode disclosed herein helps to slow the rate of decrease in SOC of the battery pack 20, thereby extending the effective EV range of the vehicle 10 of FIG. 1.

While the best modes for carrying out the invention have been described in detail, those familiar with the art to which this invention relates will recognize various alternative designs and embodiments for practicing the invention within the scope of the appended claims.

The invention claimed is:

1. A powertrain for a vehicle having an engine, comprising:
   an electric traction motor having an output shaft;
   a rechargeable battery pack;
   a supercapacitor module that is electrically connected to the battery pack; and
   first and second clutches having, at all times, opposite apply states, wherein the first clutch, when applied, connects the traction motor to the engine to thereby establish a neutral-charging mode, and wherein the second clutch, when applied, connects the output shaft to a drive axle to establish a drive mode;

wherein the drive mode uses energy from the supercapacitor module and the battery pack to power the traction motor and the neutral-charging mode uses output torque from the engine to charge the supercapacitor module and the battery pack.

2. The powertrain of claim 1, further comprising a controller in communication with the first and second clutches, wherein the controller includes a processor and tangible, non-transitory memory on which is recorded instructions for controlling the state of the clutches, and wherein the processor is configured to execute the instructions in response to a set of input signals to thereby select between the drive mode and the neutral-charging mode.

3. The powertrain of claim 1, wherein the powertrain is characterized by an absence of any planetary gear sets.

4. The powertrain of claim 3, wherein the first and second clutches are pneumatically-actuated.

5. The powertrain of claim 1, wherein the battery pack is a lead acid battery pack having at least six lead acid battery cells.

6. The powertrain of claim 1, wherein the battery pack is rated for at least 48 VDC and the supercapacitor module is configured to store at least 125% of the charge of the battery pack.

* * * * *